US010274126B2

(12) United States Patent
Edwards et al.

(10) Patent No.: US 10,274,126 B2
(45) Date of Patent: Apr. 30, 2019

(54) SYSTEM AND METHOD FOR SERVICING ROTOR OF GENERATOR USING UNIVERSAL SUPPORT DEVICE

(71) Applicant: SIEMENS ENERGY, INC., Orlando, FL (US)

(72) Inventors: James B. Edwards, Sanford, FL (US); Cezar Cisloiu, Monroeville, PA (US)

(73) Assignee: SIEMENS ENERGY, INC., Orlando, FL (US)

( * ) Notice: Subject to any disclaimer, the term of this patent is extended or adjusted under 35 U.S.C. 154(b) by 166 days.

(21) Appl. No.: 15/181,554

(22) Filed: Jun. 14, 2016

(65) Prior Publication Data
US 2017/0356592 A1   Dec. 14, 2017

(51) Int. Cl.
*F16M 11/18*   (2006.01)

(52) U.S. Cl.
CPC .................................. *F16M 11/18* (2013.01)

(58) Field of Classification Search
CPC ...... H01F 30/12; H01F 41/0206; H01F 41/06; H01F 41/10; H01F 5/04
See application file for complete search history.

(56) References Cited

U.S. PATENT DOCUMENTS

| 4,157,613 A * | 6/1979 | Morrow ................. H02K 15/16 29/596 |
| 9,764,434 B2 * | 9/2017 | Jensen ..................... B23P 11/00 |
| 9,908,712 B2 * | 3/2018 | Edwards ................ B65G 35/06 |
| 2010/0154201 A1 * | 6/2010 | Pervaiz .............. H02K 15/0006 29/598 |

FOREIGN PATENT DOCUMENTS

| DE | 19960308 A1 | 6/2001 |
| DE | 10247906 A1 | 5/2004 |

* cited by examiner

*Primary Examiner* — Minh N Trinh

(57) ABSTRACT

A system and method for servicing a generator rotor of a turbine are presented. The system includes a support device for supporting the rotor. The support device has a surface. A contact point is established on the surface where the rotor contacts the surface. A location of the contact point along the surface may be variable based on a diameter of the rotor. The support device may be able to accommodate a plurality of different rotors having a plurality of different diameters.

9 Claims, 6 Drawing Sheets

SYSTEM AND METHOD FOR SERVICING ROTOR OF GENERATOR USING UNIVERSAL SUPPORT DEVICE

FIELD

Aspects of the present invention relate to a system and a method for servicing a rotor of a generator, and in particular for a rotor removal or installation using a universal support device.

DESCRIPTION OF RELATED ART

Components of a generator may include a rotor and a stator. A gantry may be used for servicing a rotor of the generator, such as removing the rotor from the generator or installing the rotor into the generator. The gantry may carry the rotor and traverse along a removal skid until the rotor is clear of the stator of the generator. During a rotor removal or installation, the rotor may be supported on a support tool.

Generator rotors may vary by shape and size based on different applications or differences in design philosophy. Rotors with different shapes and sizes may have different diameters, different lengths and different weights. A number of different support tools may be needed for supporting different rotors due to variations of diameters, lengths and weights of the rotors during rotor removal or installation.

SUMMARY

Briefly described, aspects of the present invention relate to a system and a method for servicing a rotor of a generator, and in particular for a rotor removal or installation using a universal support device.

According to an aspect, a system for servicing a rotor is presented. The system comprises a removal skid. The system further comprises a gantry arranged on the removal skid. The gantry is configured to carry the rotor when traversing along the removal skid during servicing the rotor. The system further comprises a support device arranged on the gantry. The support device is configured to support the rotor. The support device comprises a surface. A contact point is established on the surface where the rotor contacts the surface. A location of the contact point along the surface is variable based on a diameter of the rotor.

According to an aspect, a method for servicing a rotor is presented. The method comprises supporting a rotor by a support device. The method further comprises arranging the support device on a gantry. The method further comprises traversing the gantry along a removal skid during servicing the rotor. The support device comprises a surface. A contact point is established on the surface where the rotor contacts the surface. A location of the contacting point along the surface is variable based on a diameter of the rotor.

Various aspects and embodiments of the application as described above and hereinafter may not only be used in the combinations explicitly described, but also in other combinations. Modifications will occur to the skilled person upon reading and understanding of the description.

BRIEF DESCRIPTION OF THE DRAWINGS

Exemplary embodiments of the application are explained in further detail with respect to the accompanying drawings. In the drawings.

To facilitate understanding, identical reference numerals have been used, where possible, to designate identical elements that are common to the figures.

DETAILED DESCRIPTION OF INVENTION

A detailed description related to aspects of the present invention is described hereafter with respect to the accompanying figures.

Figure 1:
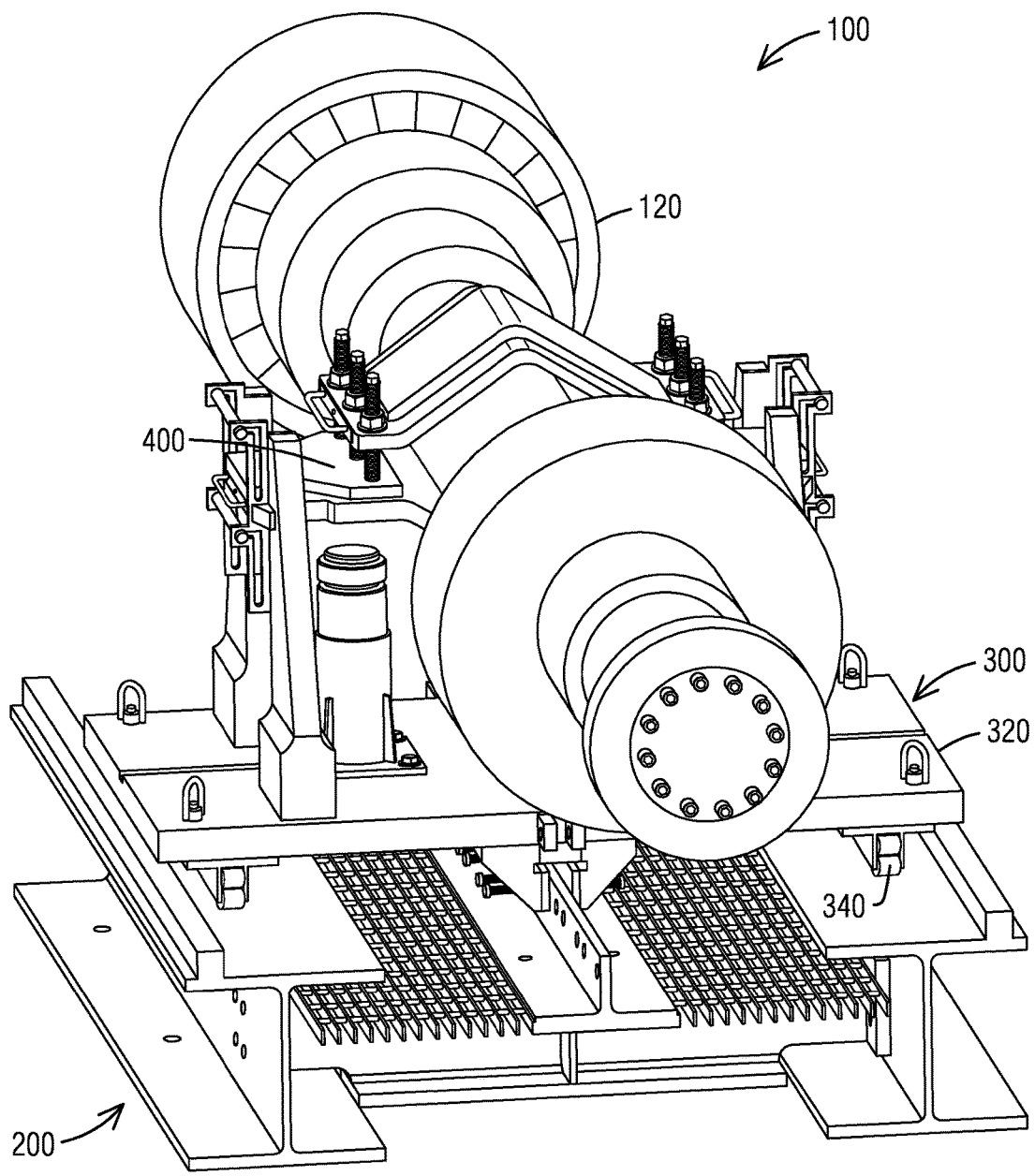
FIG. 1 illustrates a perspective view of a system for servicing a rotor according to an embodiment.

FIG. 1 illustrates a perspective view of a system 100 for servicing a rotor 120 according to an embodiment. According to the exemplary embodiment, the system 100 may include a removal skid 200. The system 100 may include a gantry 300. The gantry 300 may include a carriage plate 320. The gantry 300 may include rollers 340 attached on a bottom surface of the carriage plate 320. The rollers 340 may roll along the removal skid 200 during servicing the rotor 120. The gantry 300 is configured to carry the rotor 120 when traversing along the removal skid 200 during servicing the rotor 120. In an embodiment, the gantry 300 may include a hydraulic gantry. The system 100 may include a support device 400 that is configured to support a rotor 120. The support device 400 may be arranged on the gantry 300.

Figure 2:
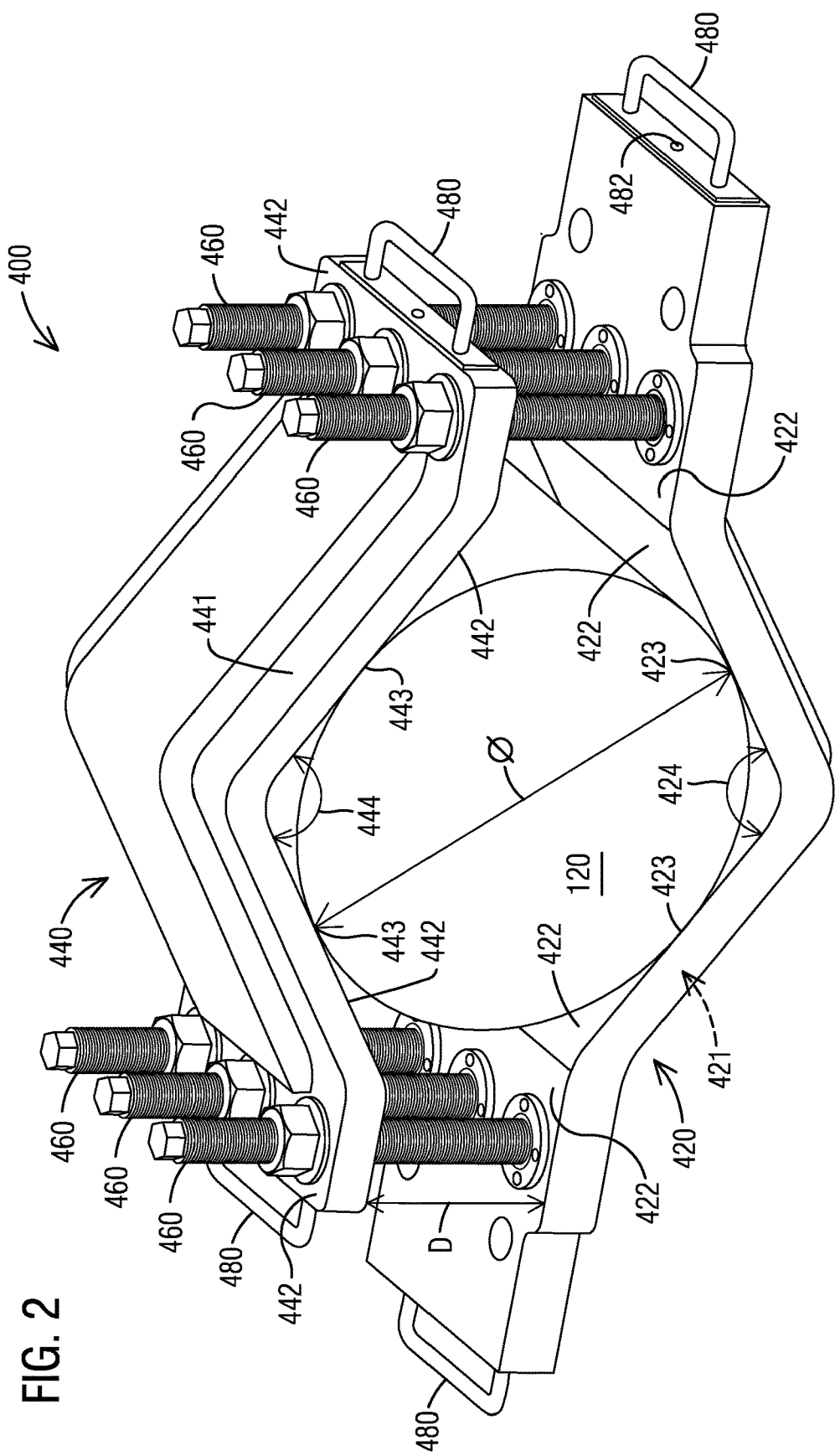
FIG. 2 illustrates a perspective view of a support device according to an embodiment.

FIG. 2 illustrates a perspective view of a support device 400 according to an embodiment. According to the exemplary embodiment, the support device 400 may include a lower part 420 which is configured to accommodate a rotor 120. The lower part 420 has a surface 421. When the rotor 120 is being supported by the support device 400, a contact point 423 may be established on the surface 421 where the rotor 120 contacts said surface 421. In an embodiment, the lower part 420 may be formed to provide sufficient load support which is exerted by a weight of the rotor 120 during installation or removal the rotor 120. In an embodiment, the lower part 420 may be formed to keep the rotor 120 from rolling off the support device 400.

The lower part 420 may include a plurality of segments 422 each having a surface 421. One or more contact points 423 may be established on the surface 421 of one or more of the segments 422 where the rotor 120 contact said surface 421. In an embodiment, the rotor 120 may contact the surface 421 of at least two of the segments 422. The at least two of the segments 422 may be arranged to form an angle 424 with respect to each other. The angle 424 may be designed based on a range of diameters Ø of a rotor 120 that may be supported by the support device 400. In an embodiment, the angle 424 may be greater than 0°, or may be greater than 10°, or may be greater than 20°. In an embodiment, the angle 424 may be less than 180°, or may be less than 170°, or may be less than 160°. In an embodiment, the at least two of the segments 422 may be adjacent segments. In other embodiments, the at least two of the segments 422 may be attached to each other via one or more other segments. The lower part 420 may be formed by the segments 422 to a V shape due to the angle 424 and relationship between the segments 422. The segments 422 may extend horizontally outward to form one or more horizontal segments 422. The support device 400 may be arranged on a gantry 300 by the one or more horizontal segments 422.

The support device 400 may include an upper part 440. When the rotor 120 is being supported by the support device 400 for installation or removal, the rotor 120 is arranged between the lower part 420 and the upper part 440. The upper part 440 has a surface 441. A contact point 443 may be established on the surface 441 where the rotor 120 contacts said surface 441. In an embodiment, the upper part 440 may be formed to reduce a load on the lower part 420 which is exerted by a weight of the rotor 120 during installation or removal the rotor 120 to prevent a deformation of the lower part 420. In an embodiment, the upper part 440 may be formed to keep the rotor 120 from rolling off the support device 400.

The upper part 440 may include a plurality of segments 442 each having a surface 441. One or more contact points 443 may be established on the surface 441 of one or more of the segments 442 where the rotor 120 contact said surface 441. In an embodiment, the rotor 120 may contact the surface 441 of at least two of the segments 442. The at least two of the segments 442 may be arranged to form an angle 444 with respect to each other. The angle 444 may be designed based on a range of diameters Ø of a rotor 120 that may be supported by the support device 400. In an embodiment, the angle 444 may be greater than 0°, or may be greater than 10°, or may be greater than 20°. In an embodiment, the angle 444 may be less than 180°, or may be less than 170°, or may be less than 160°. In an embodiment, the at least two of the segments 442 may be adjacent segments. In other embodiments, the at least two of the segments 442 may be attached to each other via one or more other segments. The surface 441 may be formed by the segments 442 to a V shape due to the angle 444 and relationship between the segments 442. The segments 442 may extend horizontally outward to form one or more horizontal segments 442.

In an embodiment, the upper part 440 may be designed symmetrically with the lower part 420. In another embodiment, the upper part 440 may be designed differently from the lower part 420.

The lower part 420 and the upper part 440 may be assembled together by an assembly device. In the illustrated exemplary embodiment of FIG. 2, the assembly device may include a stud 460. The stud 460 may be inserted through the horizontal segments 422 of the lower part 420 and the horizontal segments 442 of the upper part 440 respectively. A distance D between the lower part 420 and the upper part 440 may be adjustable using the stud 460 to accommodate a diameter Ø of the rotor 120 so that the rotor 120 may contact with both the lower part 420 and the upper part 440.

The support device 400 may include at least one handle 480. The handle 480 may be arranged on a location of the support device 400 according to the best design. In the illustrated exemplary embodiment of FIG. 2, the handle 480 may be attached on a side surface of the horizontal segment 422 of the lower part 420. The handle 480 may be attached on a side surface of the horizontal segment 442 of the upper part 440. In an embodiment, the handle 480 may be attached on a side surface of the horizontal segment 422 or a side surface of horizontal segment 442 by an attachment device, such as a screw 482.

Figure 3:
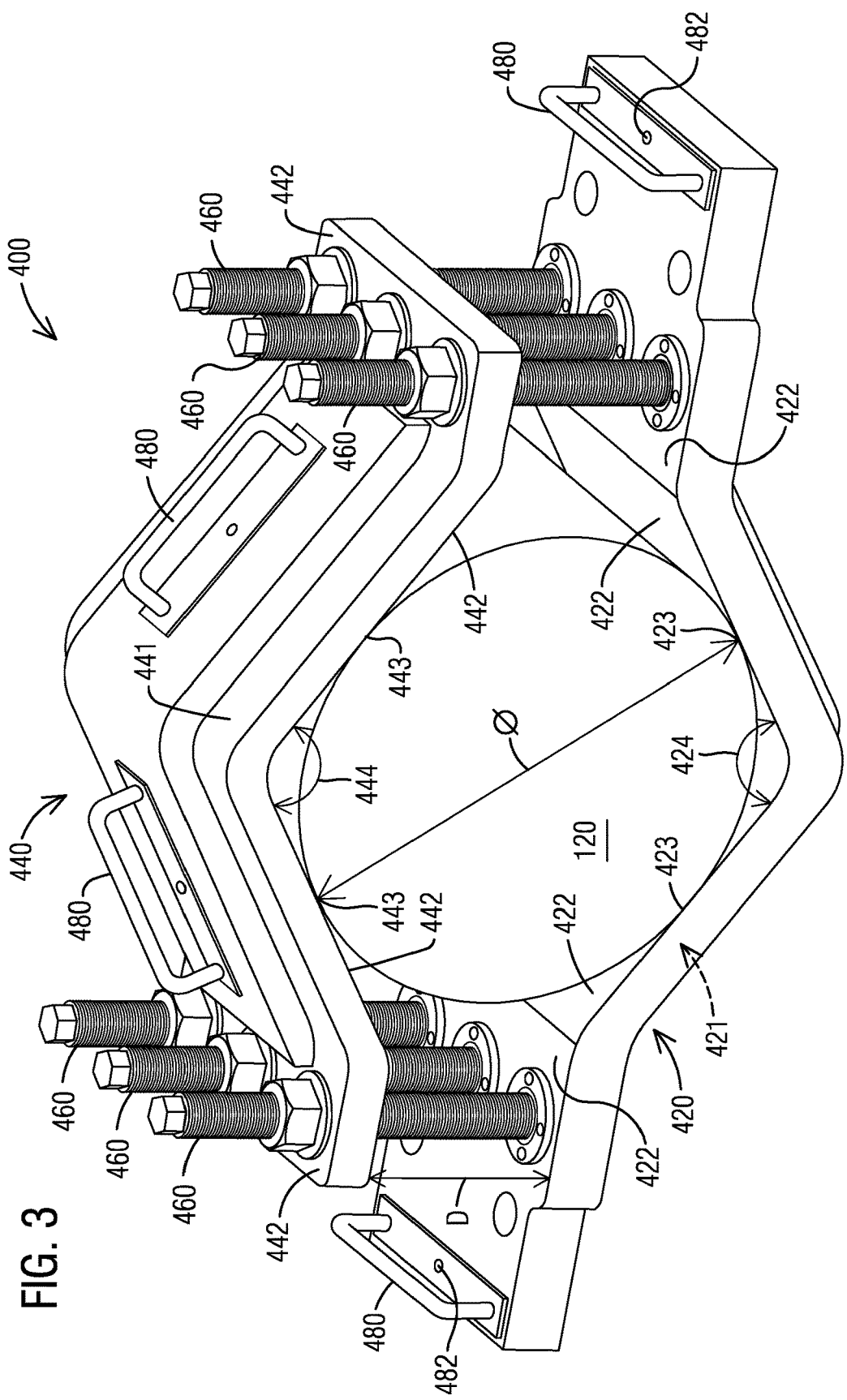
FIG. 3 illustrates a perspective view of a support device according to an embodiment, wherein a handle of the support device may be arranged on a location that is different than a location as illustrated in FIG. 2.

FIG. 3 illustrates a perspective view of a support device 400 according to an embodiment. In this illustrated exemplary embodiment, a handle 480 may be attached on a top surface of a segment 422 of the lower part 420, for example, a top surface of a horizontal segment 422. The handle 480 may be attached on a top surface of a segment 442 of the upper part 440, for example, a top surface of a segment 442 that is not horizontal.

Figure 4:
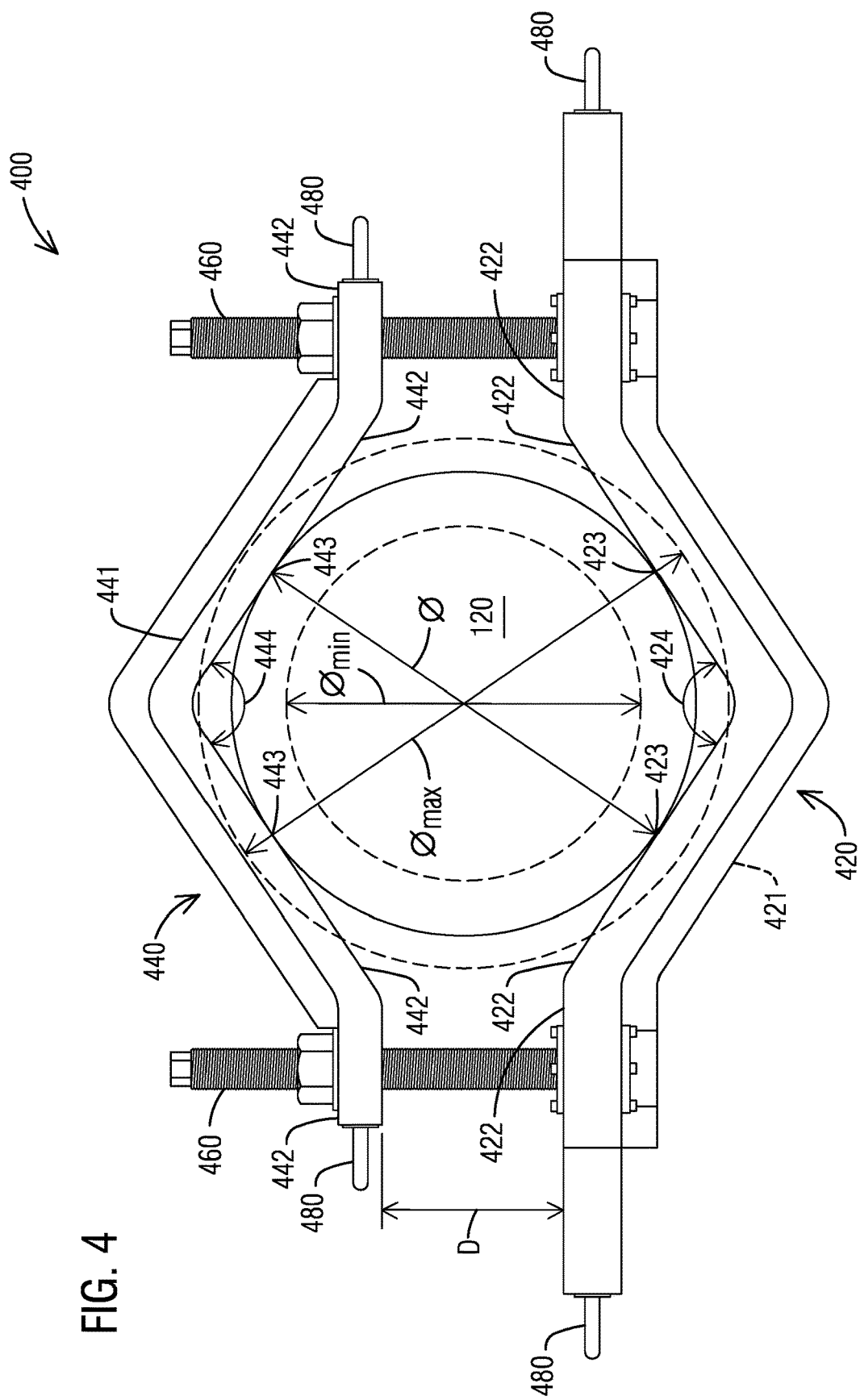
FIG. 4 illustrates a schematic view of a support device according to an embodiment, wherein the support device may be designed to accommodate a plurality of different rotors having a plurality of different diameters Ø.

FIG. 4 illustrates a schematic view of a support device 400 according to an embodiment. In the illustrated exemplary embodiment, a plurality of different rotors 120 may have a plurality of different diameters Ø. The support device 400 may be designed to be able to support the rotors 120 having different diameters Ø, for example, between a minimum diameter $Ø_{min}$ and a maximum diameter $Ø_{max}$. In an embodiment, the rotors 120 may have a minimum diameter $Ø_{min}$ of 20.3 cm (8 inch), or 25.4 cm (10 inch), or 30.5 cm (12 inch). In an embodiment, the rotors 120 may have a maximum diameter $Ø_{max}$ of 41 cm, or 45.7 cm (18 inch), or 50.8 cm (20 inch), or 55.9 cm (22 inch). In an embodiment, the rotor 120 may contact the surface 421 of at least two of the segments 422 of a lower part 420 having at least two contact points 423 respectively. A location of each contact point 423 along the surface 421 of each of the at least two segments 422 may vary based on a diameter Ø of a rotor 120. In an embodiment, the rotor 120 may contact the surface 441 of at least two of the segments 442 of an upper part 440 having at least two contact points 443 respectively. A location of each contact point 443 along the surface 441 of each of the at least two segments 442 may vary based on a diameter Ø of a rotor 120. A distance D between the lower part 420 and the upper part 440 may be adjustable using a stud 460 to accommodate the diameter Ø of the rotor 120 so that the rotor 120 may contact with both the lower part 420 and the upper part 440.

Figure 5:
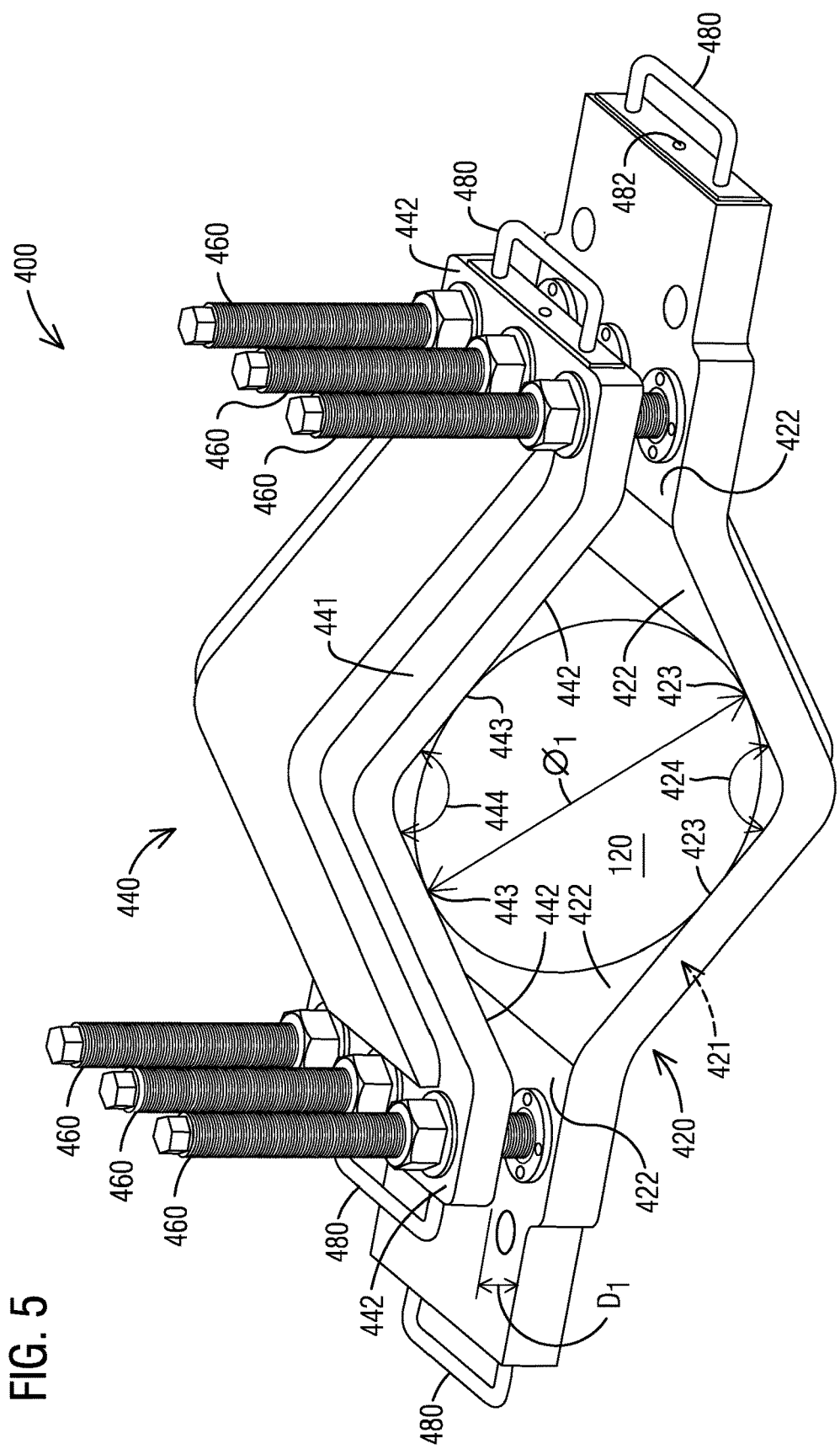
FIG. 5 illustrates a perspective view of a support device according to an embodiment, wherein the support device is designed to support a rotor having a diameter $Ø_1$.
Figure 6:
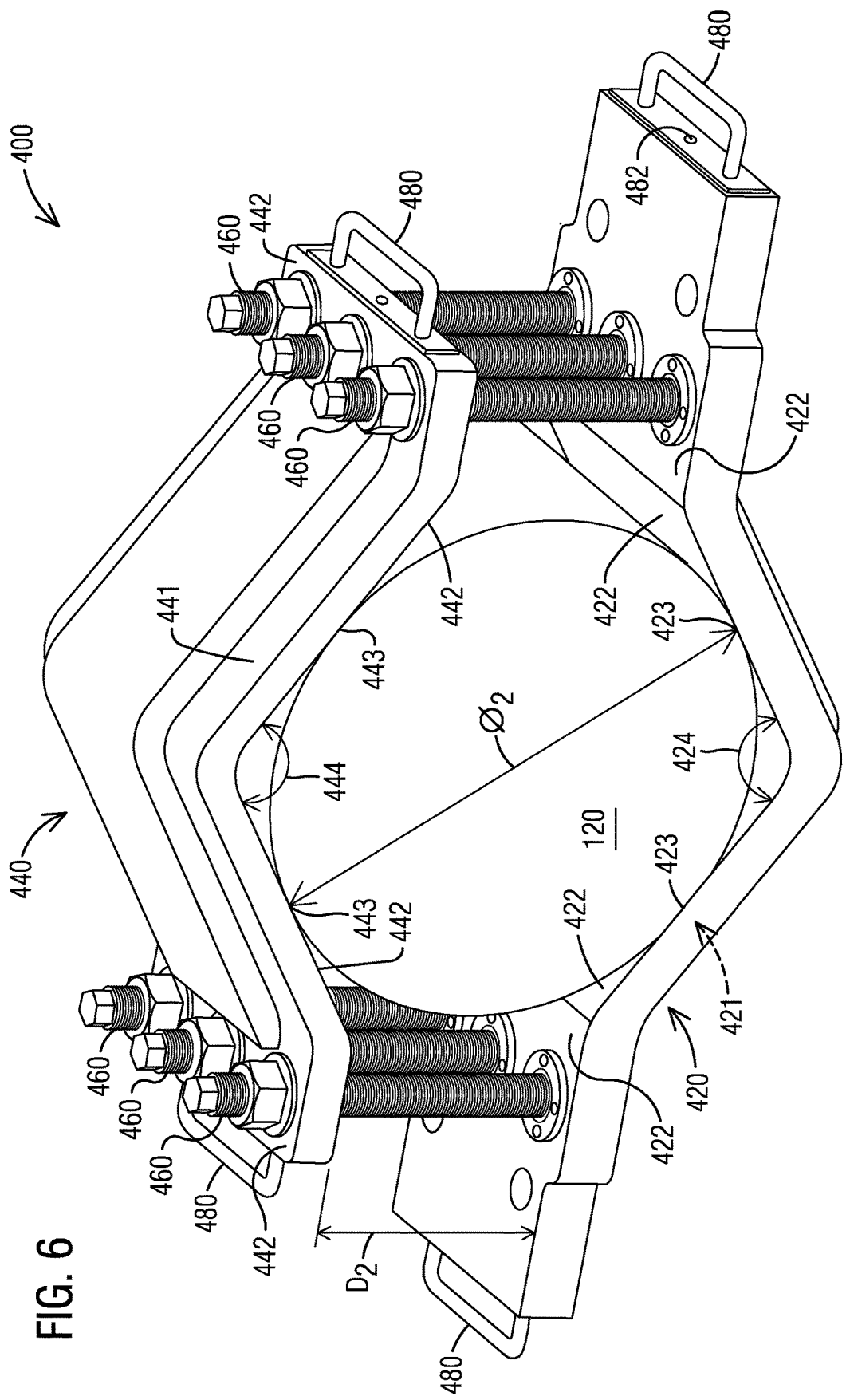
FIG. 6 illustrates a perspective view of a support device according to an embodiment, wherein the support device is designed to support a rotor having a diameter $Ø_2$ that may be different than a diameter $Ø_1$ of a rotor as illustrated in FIG. 5.

FIG. 5 illustrates a perspective view of a support device 400 according to an embodiment, where the support device 400 is configured to support a rotor 120 having a diameter $Ø_1$. FIG. 6 illustrates a perspective view of a support device 400 according to an embodiment, where the support device 400 is configured to support a rotor 120 having a diameter $Ø_2$. In the illustrated embodiments, a diameter $Ø_2$ of a rotor 120 in FIG. 6 may be larger than a diameter $Ø_1$ of a rotor 120 in FIG. 5. A location of a contact point 423 along a surface 421 of a lower part 420 as illustrated in FIG. 6 may be different than a location of a contact point 423 along a surface 421 of a lower part 420 as illustrated in FIG. 5 to accommodate the different diameters $Ø_2$ and $Ø_1$ of rotors 120. A location of a contact point 443 along a surface 441 of an upper part 440 as illustrated in FIG. 6 may be different than a location of a contact point 443 along a surface 441 of an upper part 440 as illustrated in FIG. 5 to accommodate the different diameters $Ø_2$ and $Ø_1$ of rotors 120. In the illustrated embodiment, a distance $D_2$ between a lower part 420 and an upper part 440 as illustrated in FIG. 6 may be larger than a distance $D_1$ between a lower part 420 and an upper part 440 as illustrated in FIG. 5 to accommodate a diameter $Ø_2$ of a rotor 120 that is larger than diameter $Ø_1$ of a rotor 120.

According to an embodiment, the illustrated system 100 may be designed for servicing a generator rotor 120 of a turbine, such as for installation or removal generator rotor 120 of a turbine. A support device 400 of the system 100 may have a sufficient strength to be able to support a load exerted by a weight of a generator rotor 120 of a turbine to raise or lower the rotor 120 during servicing the rotor 120. According to an embodiment, a weight of a generator rotor 120 of a turbine may be at least 25855 kg (57000 lbs), or at least 45359 kg (100000 lbs), or at least 66179 kg (145900 lbs). According to an embodiment, a support device 400 of the system 100 may have a sufficient lateral strength to be able to push or pull a generator rotor 120 of a turbine during servicing the rotor 120.

According to an embodiment, a support device 400 for supporting a rotor 120 may be made from a material having a weight for easy assembly. According to an embodiment, a support device 400 may be made from a material that enables the support device 400 to be assembled in place under the rotor 120 by personnel. In an embodiment, a support device 400 may be made from a material such as aluminum.

According to an embodiment, the illustrated support device 400 for supporting a rotor 120 may be installed into or removed from the system 100 without using a crane. A time for installing or removal the support device 400 may be dramatically reduced. The system 100 may provide a favorable impact on job schedule to turbine owners.

According to an embodiment, the illustrated support device 400 may provide a universal tool application for supporting a rotor 120 that may fit a fleet of turbines having different sizes of rotors 120. The system and method may eliminate a need to purchase and store several different tools for turbines having different sizes of rotors 120. The illustrated system and method may provide a financial benefit to turbine owners. The illustrated system and method may standardize tooling, training, or inventory to turbine owners because of a universal tool application.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

LIST OF REFERENCES

100 System for Servicing a Rotor
120 Rotor
200 Removal Skid
300 Gantry
320 Carriage Plate
340 Roller
400 Support Device
420 Lower Part
421 Surface of Lower Part
422 Segments of Lower Part
423 Contact Point on Surface of Lower Part
424 Angle between Segments of Lower Part
440 Upper Part
441 Surface of Upper Part
442 Segments of Upper Part
443 Contact Point on Surface of Upper Part
444 Angle between Segments of Upper Part
460 Stud
480 Handle
482 Screw
D Distance between Lower Part and Upper Part
Ø Diameter of Rotor

What is claimed is:

1. A system for servicing an associated rotor comprising:
   a removal skid;
   a gantry arranged on the removal skid, wherein the gantry is configured to carry the associated rotor when traversing along the removal skid during servicing the associated rotor; and
   a support device arranged on the gantry that is configured to support the associated rotor,
   wherein the support device comprises a lower part and an upper part,
   wherein one or more contact points are established on a surface of the lower part and on a surface of the upper part where the associated rotor contacts the one or more contact points, and
   wherein a location of the one or more contact points along the surface of the lower part and the surface of the upper part is variable based on a diameter of the associated rotor.

2. The system as claimed in claim 1, wherein the lower part comprises a plurality of segments, wherein the upper part comprises a plurality of segments, and wherein the one or more contact points are established on the surface of one or more of the segments of the lower part and on the surface of one or more of the segments of the upper part where the associated rotor contacts the surface of the one or more of the segments of the lower part and the surface of the one or more of the segments of the upper part.

3. The system as claimed in claim 2, wherein the associated rotor contacts the surface of at least two of the segments of the lower part and the surface of at least two of the segments of the upper part, wherein the at least two of the segments of the lower part are arranged to form an angle with respect to each other, and wherein the at least two of the segments of the upper part are arranged to form an angle with respect to each other.

4. The system as claimed in claim 3, wherein the angle between the at least two of the segments of the lower part and the angle between the at least two of the segments of the upper part are determined based on a range of diameters of a plurality of associated rotors to be supported.

5. The system as claimed in claim 2, wherein the lower part and the upper part are formed by the segments to a V shape.

6. The system as claimed in claim 1, wherein the associated rotor is arranged between the lower part and the upper part during servicing the rotor.

7. The system as claimed in claim 1, wherein the lower part and the upper part are assembled together by an assembly device.

8. The system as claimed in claim 7, wherein a distance between the lower part and the upper part is adjustable using the assembly device based on the diameter of the associated rotor.

9. The system as claimed in claim 1, wherein the associated rotor comprises a generator rotor of a turbine.

* * * * *